United States Patent [19]

Deis

[11] 4,034,345
[45] July 5, 1977

[54] MICROPROGRAMMABLE COMPUTER DATA TRANSFER ARCHITECTURE

[75] Inventor: August Deis, Eiserfeld, Sieg, Germany

[73] Assignee: U.S. Philips Corporation, New York, N.Y.

[22] Filed: Aug. 20, 1975

[21] Appl. No.: 606,162

[30] Foreign Application Priority Data

Aug. 23, 1974 Germany .......................... 2440390

[52] U.S. Cl. .............................................. 364/200
[51] Int. Cl.² .............................................. G06F 9/00
[58] Field of Search ................................. 340/172.5

[56] References Cited

UNITED STATES PATENTS

| 2,891,723 | 6/1959 | Newman et al. | 235/152 |
| 3,134,092 | 5/1964 | Newman et al. | 340/172.5 |
| 3,434,112 | 3/1969 | Yew | 340/172.5 |
| 3,939,455 | 2/1976 | Toyosawa | 340/172.5 |
| 3,970,998 | 7/1976 | Weisbecker | 340/172.5 |

Primary Examiner—Gareth D. Shaw
Assistant Examiner—C. T. Bartz
Attorney, Agent, or Firm—Frank R. Trifari; Daniel R. McGlynn

[57] ABSTRACT

The invention relates to a microprogrammed computer whose architecture is determined by a simple and rigid format of the controlling micro-instruction. Each micro-instruction controls a data transfer and has at least four parts each of which are within a single micro-instruction. A first part always specifies the data source and data sink between which the data transfer is to take place. In a second part, conditions are stated for transfer to, or writing into the data sink. In a third part, a specific counting register out of a number of counting registers is addressed and, furthermore, it is specified how the contents of the counting register must be modified parallel to the transfer. In a fourth part, further data is contained; the fourth part may be controlled as a data source, with data transfer from the source to an arbitrary data sink being possible. In the case of transfer to the operation register of the arithmetic unit, such data indicates the logic or arithmetic operation. In the case of transfer to, for example, a counting register, the data may be employed to derive an initial address therefrom. The operation code register may advantageously have a capacity which corresponds to the length of two storage words.

9 Claims, 2 Drawing Figures

MICROPROGRAMMABLE COMPUTER DATA TRANSFER ARCHITECTURE

The invention relates to a micro-program store from which under control of a micro-instruction signal micro-instruction signals can be serially transferred to a micro-instruction register, with a clock-pulse generator, a micro-program counter for controlling the micro-program store, a working store, an arithmetic element and a counting-register group, the working store, micro-instruction register, arithmetic element and counting register group being connected to an internal data line. In conventional computers an arbitrary user program or application program is generally performed at several levels. The programmer then generally writes the program in a symbolic or higher-level program language. Prior to the actual execution the program is translated into series of machine instructions by a specific translation program. Thus, a computer program is preferably stored in the working store of the computer in the form of a series of machine instructions (in a so-called machine language) and the sequence of the machine instructions is processed serially and, as the case may be, with specific jumps and loops. In the present context the sequence of machine instructions to be discussed is called a "micro-program".

For each computer a specific set of machine instructions is provided, and each machine instruction controls the execution of a specific function by the computer. In most computers this is effected so that a machine instruction calls a specific sequence of micro-instructions which are stored in a micro-program store to an operation code register. From there each micro-instruction controls an elementary function or operation in the computer, or an elementary combination of functions or operations. For a satisfactorily programmable computer a sufficiently large set of machine instructions is needed. Moreover, each machine instruction invokes a series of sometimes many micro-instructions. From this it is evident that a very extensive micro-program is needed if the individual micro-instructions are not effectively composed, so as to enable the most versatile combination of elementary functions to be controlled within the scope of the relevant computer. Generally such versatile combinations lead to an extensive and complicated device for decoding the micro-instructions. This, in its turn, then leads to a comparatively expensive computer.

It is an object of the invention to provide a computer with such an arrangement of the micro instructions and corresponding design of the computer itself that each micro-instruction controls a most extensive function or combination of functions in the computer, while only a simple and conveniently arranged device is required for decoding the micro-instructions. This object is achieved by the invention which is characterized in that to a first part of the micro-instruction register a first decoder is connected for controlling a data source and parallel thereto a second decoder is connected for controlling a data sink, that to a second part of the micro-instruction register a third decoder is connected with additional condition inputs for selectively generating an inhibit signal for the data transfer from the data source to the data sink, that to a third part of the micro-instruction register an addressing element of the counting register group is connected, as well as a control element of the counting register group for controlling a counter position, and that a fourth part of the micro-instruction register for supplying a data character or address character is connected to said internal data line as a data source. Said arrangement of the micro-instructions is based on the recognition that an essential part of the functions in a computer concerns the transfer of data. Further groups of functions are counting, deciding, and the formation of logic and arithmetic combinations of the input data. As a result, it is likely that each part or at least most parts of each micro-instruction are utilized when the above-mentioned functions are jointly included therein. As moreover the structure, i.e. the format, of the individual micro-instructions is defined so that this is similar for all micro-instructions, this also enables a simple decoding circuit for the micro-instructions to be used. The individual micro-instructions, of which not all individual parts are used, give rise to only few extra additions, which is moreover amply compensated for by the simple decoding, Moreover, it is found that for example arithmetic and logic combinations can readily be formed implicitly by data transfer.

In order to form for example a micro-instruction which does not control a data transfer, a condition which is definitely not satisfied is included in the condition field thereof. It is favorable to ensure that the condition is not operative during read-out of data from the source, but only during writing into the sink, for in that case for elxample the data read out from the data source may represent a condition or a part of a condition for a function to be performed subsequently. There is great freedom in defining which parts of a computer may be employed as data source or data sink respectively. For example, the micro-program counter may be addressed as a data source, so that special set instructions and thus their specific decoding and execution may be dispensed with: setting is then effected as a normal data transfer.

The arrangement of the micro-instructions according to the invention is a very simple manner in that each storage address location comprises only part of a micro-instruction and that always single parts of a micro-instruction are read-out of the micro-program store and are written into a micro-instruction register which is divided into corresponding fields. Thus, it is possible to change only specific parts of the contents of the micro-instruction register and further use the preceding micro-instruction, so that storage capacity and time are saved. In one example, a micro-instruction register comprises 32-bit locations, while the storage words can only contain 16 bits at a time. By reading only a single storage word the elementary functions to be performed may then be changed in a versatile manner. Due to the great length of the micro-instruction register an extensive set of elementary function may be implemented.

The invention will be described in more detail with reference to some Figures.

Figure 1:
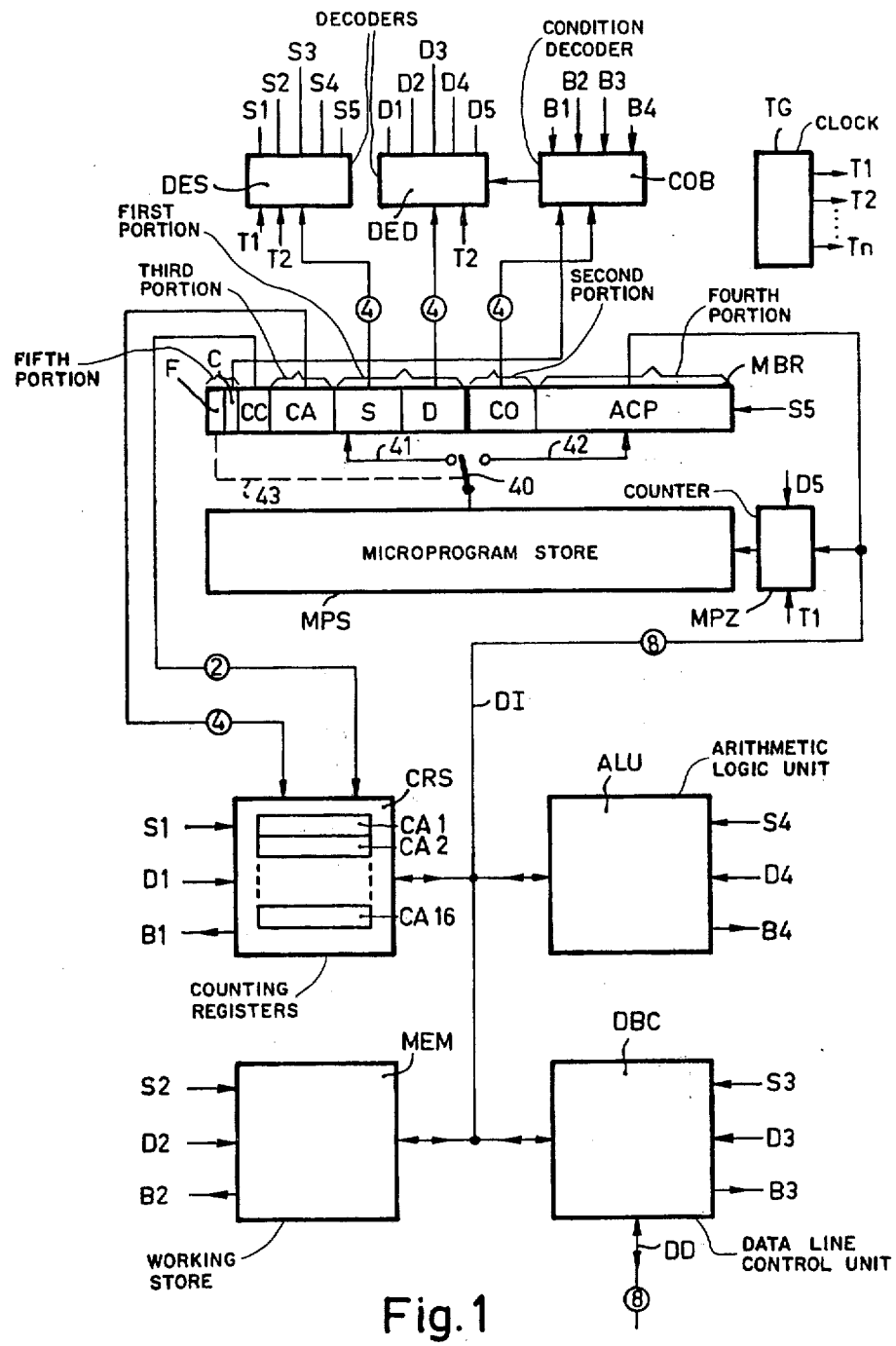
FIG. 1 shows a block-schematic diagram of a computer according to the invention.

The computer of FIG. 1 comprises two data lines DI, DD, a working store MEM, control lines S1 ... 5, D1 ... 5, B1 ... 4, the data line control unit DBC, a counting register group CRS, a micro-program store MPS, a micro-program counter MPZ, a micro-instruction register with storage sections F, C, CC, CA, S, D, CO and ACP, an arithmetic element ALU, a clock pulse genertor TG with clock pulse lines T1, 2 ... n, two decoders DES, DED a condition decoding unit COB and a branching switch 40 with branching lines 41, 42. In the case of multiple lines the number of lines is indicated by means of a numeral in a circle.

In FIG. 1 the individual parts of the circuit are connected by an internal data line DI which consists of eight parallel lines as is shown in the Figure, and via which in general data transfer is possible in two directions. Furthermore, some control lines are shown which will be described in more detail.

The working store MEM is for example a conventional semiconductor memory, and can take data words to be written from the internal data line DI, or it can supply read-out data words to said data line. This is determined by signals at the control inputs S2, D2. A signal at input S2 controls the read-out, the store MEM then constituting a data source. A signal at input D2 controls the write-in so that the store MEM forms a data sink. Furthermore, via the internal data line DI the store also receives the address at which a word is to be read out or written respectively. Upon receipt of the address the working store MEM again forms an information source: for this purpose the control input S2 for example comprises two lines, which for simplicity are represented as a single line. The same applies to the control input D2 which also comprises for example two lines, the one line controlling the receipt of the data word as a data word to be stored and the other line, in contradistinction thereto, controlling this as the receipt of an address. For many purposes it may be necessary to further process the address originally contained in the working store, MEM, which address may for example be temporarily stored in an address register. In respect of the function of the control inputs S2 and D2, it is assumed that in the working store MEM as well as in the other sections of the computer for each register which can store or supply a data work switches, which for simplicity are not shown, are included in the parallel-connected input and output lines, the switches in the input line being energizable and then transmitting by a control line of the decoder DED (here D2) and the switches in the output lines by a control line of the decoder DES (here S2). For the section DBC this control is shown in more detail in FIG. 2 and is discussed hereinafter.

Moreover, an additional condition line B2 emerges from the working store MEM via which line specific situations can be signalled, such as for example an overflow condition with respect to an address or the occurrence of a fault in the event of a situation of internal overloading in the store MEM. Such signals are then applied to the condition decoder unit COB.

Figure 2:
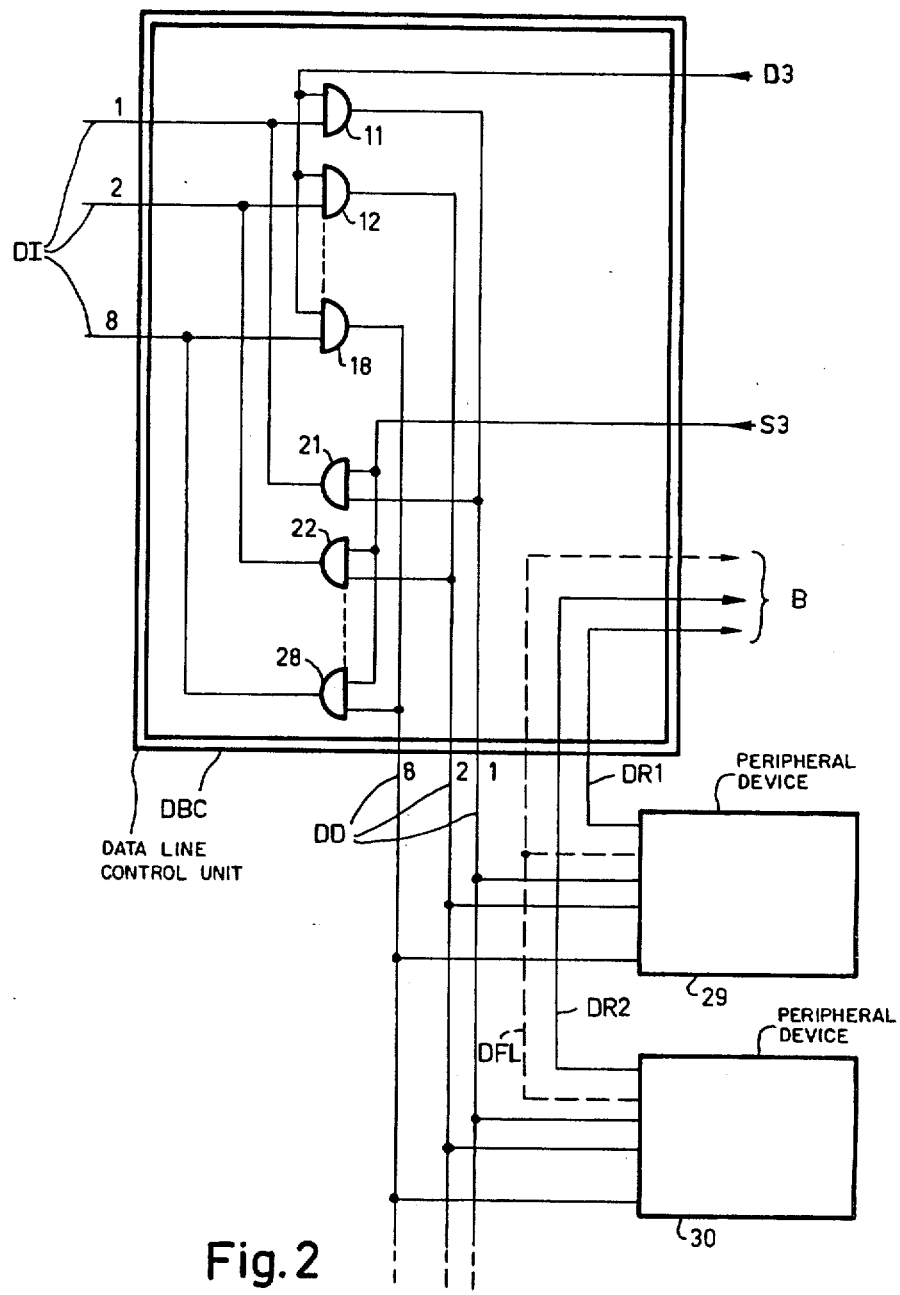
FIG. 2 shows some components which control the information transfer.

A second component is the data line control unit DBC which first of all connects the internal data line DI to an external data line DD, which may also consists of eight parallel connected lines. In this respect FIG. 2 shows the data line control unit DBC in somewhat greater detail. This Figure shows logic transfer gates 11 ... 18, 21 ... 28, lines DI, DD, S3, D3, B3, DR1, DR2, DFL and peripheral devices 29, 30. Components corresponding to those in FIG. 1 are denoted by corresponding reference numerals. The peripheral equipment may operate as data source, for example an optical or card reader 30, as data sink, for example a line printer 29, or as both, for example a backing store, not shown, with or without random-access capability. The external data line DD thus also tranfers data in both directions, which data may relate to data characters or also to command signals.

When the data at the internal data line DI is to be transferred to an output device via the external data line DD, the line D3 is energized, so that the data line control unit DBC operates as an information sink. Gates 11 ... 18 are opened by a signal at the line D3. These gates may have three states, so that a logic 0, a logic 1 and an "inhibiting signal" imply different signal levels, which "inhibiting signal" can each time to overruled by a bivalent logic signal. On the other hand, only a bivalent output signal can be produced, while detection of a word is effected by an OR-circuit on the lines DI (1 ... 8) and the word 00000000 being meaningless. In a similar manner, the line S3 is energized when the data line control unit DBC is to operate as a data source, in that it applies the data supplied by an input device to the internal data line DI: in that case the gates 21 ... 28 are opened. The inputs D3 and S3 are energized non-concurrently. The data line control unit DBC also has a condition output which in the present instance consists of a number of separate lines via which conditions of the various peripheral devices are signalled to the control circuitry. For example, a signal at the line DR1 may mean that the line printer 29 is ready to accept information. A signal at line DR2 may mean that in the read apparatus 30 information is available (for example a character) for application to the computer. These lines DR1, 2 thus relate to the data conditions in the peripheral devices. Moreover, the line which is common to all peripheral devices may indicate a condition of electrical readiness, which for example relates to the temperature of a storage matrix, speed of rotation of a storage disk, etc.

The previously stated interconnection of other multiple data lines may be effected in a corresponding manner as has been described for the data line control unit DBC.

A further section is the arithmetic and logic unit ALU which constitutes the actual arithmetic unit and in which the arithmetic and logic relations are formed. This unit may be implemented as a commercially available "micro-processor". In practice the unit ALU includes an arithmetic element for the generation of logic and/or arithmetic functions of two operands, further two operand registers in which said operands are stored, and an operation register, of which the data stored in it controls the arithmetic element so as to process the operands. Each of said three registers is loaded in that a data word which is available at the internal data line DI is transferred to the relevant register, which is effected by a corresponding signal at input D4, which in its turn consists of several conductors, namely one for each register. The operation code is thus transferred to the operation register as a normal data character, so that during transfer no distinction is made between data characters and commands, which distinction only obtained by storage in the operation code register or in an operand register due to a signal at one of the lines of input D4. In a similar way an operand register of the processing result from a register which operates as an accumulator is read out by signals at the relevant line of input S4. It is to be noted that it is also possible to each time energize one conductor of the two inputs S4 and D4, i.e. that a unit may function simultaneously as a data source and a data sink. For the unit ALU this may be useful for writing the processing result into the operation register. The result of the operation is then already present in an operand register, while the effect of writing into the operation register is that the operation to be performed can be modified by the result of a previous operation. Different combinations are also possible. The condition output B4 for example supplies a signal upon a transfer or an overflow condition respectively. Further conditions, such as specific contents of the result or of a register, are possible so that the output B4 may also comprise several lines. It is to be noted that a unit ALU which takes the form of a microprocessor is not a computer in accordance with the terminology used hereinbefore, because it implements only some functions of those which may be implemented by the various units of FIG. 1, for example of the units DBC and MEM.

A further component is the counting register group CRS which comprises for example sixteen similar counting registers CA1 ... 16, which for example operate as index registers or as counters for counting the number of program loops passed through. The counting register group also has an input D1 for a signal upon which the counting register group is controlled as a data sink for writing a data word appearing on the internal data line DI into one of the sixteen counting registers. Into which of the essentially equivalent counting registers CA said data word is written is in this case not determined by a corresponding line at the input D1 but by an address line shown at the top edge of the unit CRS, which line comprises four parallel lines and which is connected to the output of the section CA of the micro-instruction register MBR.

Furthermore, a counting operation or, more accurately, an elementary arithmetic operation may be performed in the counting register group CRS by the counting register which is addressed. The nature of this operation is controlled by an additional input line of the counting register group, which line comprises two lines and which is connected to the output of section CC of the micro-instruction register MBR. As the case may be, said additional operation is performed after the transfer of a data word into the relevant counting register.

By means of the signal at input S1 the contents of the counting register CA (1,2 ... 1) which is addressed by the sink CA via the address input can be read out and transferred via the internal data line DI. Furthermore, the counting register group CRS may be controlled simultaneously as a data source and a data sink in that the two inputs S1 and D1 receive a signal, which is for example useful when the operation control input controls a subtract operation, for in that case the contents of the addressed counting register is subtracted therefrom in said register and is thus set to zero. Thus, an additional instruction for setting the counting register to zero is dispensed with. This simplifies the structure of the computer.

The counting register group CRS also has a condition output B1, which can indicate whether the contents of the addressed counting register lies between specific limits, for example whether a counting register which counts the number of program loops that have been performed has arrived at the zero. Said condition may be treated differently than the conditions for other units as will be explained hereinafter.

One of the most important sections of the computer according to the invention is the micro-program control section. This section first of all comprises a micro program counter which is connected to the internal data line DI and which furthermore receives a clock-pulse signal T1 from the clock pulse generator TG for controlling a counter-advance operation. Furthermore, the micro-program counter is connected to an output D5 of the decoder DED. The micro-program counter MPZ addresses the microprogram store MPS of which each time a micro-instruction is stored in a micro-instruction register MBR via a line to be discussed hereinafter. The micro-program control section further includes a clock-pulse cycle control TG, which produces a number of clock pulses T1, T2 ... $T_n$, which are shifted in time relative to each other and which may overlap each other partially, and which control section controls consecutive functions of a micro-instruction. The format of the micro-instructions will be described in more detail with reference to the indication given in the individual parts of the micro-instruction register MBR.

Approximately in the center of the instruction register the fields marked S and D are located, which in coded form represent a data source and a data sink. For this purpose, the associated outputs of the instruction register are permanently connected to a decoder DES, which decodes the binary four-bit code received from section S as a "1-out-of-$n$" code, so as to energize one of the control lines S1, 2 .... The maximum number of separate control lines follows from the number of positions of the code, in the present case for example sixteen. In this respect allowance is to be made for the fact that lines S2 and S4 as well as the corresponding lines D2 and D4 of the relevant units may comprise several individual conductors. Decoding of the data contained in the section S of the micro-instruction register MBR in the decoder DEZ and control of the respective units of the computer by the decoded signal is effected unconditionally, i.e. that data can be read out of any data source under control of any micro-instruction. Moreover, the decoder DES receives the clock pulses D1 and D2 from the clock pulse generator TG, so that decoding is effected simultaneously with the advance of the micro-program counter MPZ under control of the clock pulse T1 and thus with the read-out of the next micro-instruction. In a corresponding manner the section D of the micro-instruction register MPZ defines the identity of the data sink in a binary code of for example four bits, and said code is received by the decoder DED and decoded as a "one-out-of-$n$" code for one of the individual control lines D1, 2 ... This decoding is further effected under joint control of the clock signal T2 of the clock-pulse generator TG and of a signal from the condition decoding unit COB via the line indicated in the Figure. Only if this last-mentioned line releases the decoding or the data output, a data sink is also controlled, i.e. that the data which is read out of a data source (assigned by the decoder DES) and available at the internal data line DI is only written into the data sink to be assigned when said condition is fulfilled. As the decoder DED is released by the clock signal T2 at a later instant than the decoder DES by the clock signal T1, a data character which has already been read out of a data source, due to its information content, may still give rise to a condition or a change of a condition, which can also be taken into account for the condition for writing said data character into a data sink.

The condition decoding unit COB is controlled by the data from two sections of the micro-instruction register, namely the section C at the beginning and the section CO in the center thereof. Thus, at least two conditions together may be allowed for. The section C in the present example comprises a single bit location. The information thereof indicates whether the information of the condition B1 of the counting register group CRS is to be examined or not. The condition B1 is produced by the addressed counting register CA1 ... 16 and indicates whether the contents thereof, as the case may be after subjecting said contents to an elementary operation (see above) lies in a positive or in a negative counting range. The use or not of the information of the other condition inputs B2, 3, 4 and the nature of this use is specified in the section CO of the micro-instruction register MBR. In this respect allowance is to be made for the fact that for example the condition input B3 of the data line control section DBC consists of a number of separate conductors, preferably of at least one conductor for each peripheral device to be connected externally.

Parallel to the data transfer between said data source and sink an additional function may be performed in the counting register group CRS. The address of the counting register to be controlled within the group is stated in binary coded form by the section CA, which is for example decoded in the counting register group. In the case of four binary locations for the section CA 16 counting registers may thus be addressed. The section CC indicates what modification is to be made to the counting register addressed by the section CA. Typical changes or operations are: 0 (no change) +1, −1, ×2. With these operations the major functions can be realized directly, for example those which are necessary for the use of a counting register as an index register.

As described previously the counting register group CRS may also be controlled as a data source or data sink respectively, which then specifically relates to the counting register CA1 ... 16 addressed by the micro-instruction field CA. Specifically when said counting register is controlled as data sink, the elementary operation indicated by the micro instruction field CC for example causes the addition of the data word present on the internal data line DI to the previous contents of the counting register instead of an increase by 1, or the subtraction of the data word which arrives via the line DI from the contents of the addressed counting register. Thus, many different operations are possible in the counting register group CRS, without the necessity of an alteration to the fundamental structure and embodiment of the micro-instruction.

The section ACP of the micro-instruction or microinstruction register respectively, may contain a data character which can be applied to the internal data line DI under control of a signal at input S4. Thus, the micro-instruction register operates as a data source, eight data bits of the section ACP being output in parallel. These may for example be all eight data bits of the section ACP, the section CO then containing eight bits, in contradistinction to the example shown. In other specific cases, as will be explained hereinafter, the ACP section may advantageously contain a greater number of data bits, for example 12, so that the entire microinstruction register MBR always contains 32 bits. Depending on the information content in the rest of the micro-instruction register the data read out of the section ACP may be written into a data sink to be specified so as to initiate various functions.

One possibility is to directly set the micro-program counter MPZ by the data contained in the section ACP in that said counter is controlled as a data sink via the input D5 so as to initiate a jump in the micro-program. By activation of a corresponding other data sink, the data contained in the section ACP may for example be transferred into a counting register Ca1 ... 16 of the counting register group CRS, or is transferred to the operation register of the arithmetic element ALU and then determines the arithmetic operation to be performed therein. In other applications the ACP section may serve to indicate a sub-address, for example in the working store MEM. Said sub-address may then indicate to the least significant address bits of such a storage element, in which a great number of addresses is possible. The most significant address bits of such an address are determined by the signals at the control lines shown (for examaple at the lines S2 and D2), which consists of more than two conductors, of which each conductor line may then control a separate module in the working store, which comprises several modules. In other situations an address may consist of for example two times eight bits, so that an address is to be transferred in two transfer cycles. As the storage addresses required in consecutive operations are usually located in the same storage field, the most significant address bits can usually remain unchanged and only few additional transfer cycles are needed. As the case may be, even twelve address bits may be accommodated in the section ACP, the most significant 4 bits being transferred only in the case of a "far" address jump. This can be controlled by an appropriate signal at the line S5 which is then for example duplicated. Another possibility is furthermore that the section ACP contains additional data for specific data sources or sinks (which data may be or may not be contained in the above-mentioned four additional bit positions), so that the function to be performed is further specified. An example may be that the additional data as a counter-balance indicates how many times the operation is to be repeated: this data can then be stored in a counting register and be decreased by 1 per operation.

It can be seen from the structure of the micro-instruction or the micro-program instruction register respectively that the right-hand section with the fields CO and ACP need not be changed in the case of many consecutive micro-instructions, for example when the section ACP does not operate as a data source (no signal appears at line S5) and always the same condition, stored in the section CO, is checked by means of the condition decoder COB. It is then advantageous if the micro-program store MPS is arranged so that upon each address indicated by the micro-program counter MPZ it only fills a part of the micro instruction register MBR with new data: said register may consist of two parts of equal length, the parts F, C, CC, CA, S and D respectively, and the parts CO and ACP. Thus, a microinstruction may be composed of four individual parts and in particular the parts which may be retained need not be read out, but only the parts to be changed are read out. Thus, the micro-program store may be used much more effectively and may thus be more compact. Particularly simple control is obtained if a newly requested micro-instruction part is initially always stored in the first part of the micro-instruction register MBR: The distributor switch 40 (which may consist of 16 switching elements in parallel) then passes the data from the micro-program store MPS via the (16-fold) line 41. The data from the first location F of the microinstruction register may then subsequently control the distributor switch 40, and moreover complete the micro-program count via a connection not shown with data which causes the count to be raised by one. As a result, the next storage location of the micro-program store MPS is also controlled and the data of the storage word stored there is stored in the second half of the micro-instruction register MBR via the distributor switch 40 and the (16-fold) line 42. Subsequently, the switch 40 is reset (for example by a suitable pulse from the clock pulse generator TG). When the data from the location F has the other binary value, the previous contents of the right half of the micro-instruction register can be retained unmodified.

The micro-instruction register MPS may be divided into several parts, for example into 3 × 12 bits, in which case more bit positions are needed for the field F. If always the first 12-bit field is read out first and the field F counts two bits. 00 means: changing the first field only suffices; 01: further only the second field to be refilled; 10: further only the third field to be filled; 11: further the two (second and third) fields to be re-filled. The micro-instruction register MBR may also comprise one or more D . . . control inputs and may operate as a data sink (for example in the section ACP thereof).

Although the micro-instruction and thus the micro-instruction register MBR have a very rigid structure and thus always control a fundamentally corresponding procedure, an appropriate effective choice of the individual parts of this structure will enable extremely flexible control, without rendering the decoding of a micro-instruction particularly complicated or obscure. Parts of an instruction which are not used can be rendered inoperative by a specific information contents which does not control implementation of a function.

What is claimed is:
1. A microprogrammable computer comprising
a microprogram store for storing micro-instructions;
a micro-instruction register connected to said microprogram store, having first, second, third, fourth, and fifth portions;
means for serially transferring information from said microprogram store to said micro-instruction register;
a microprogram counter connected to said microprogram store;
a clock pulse generator having an output connected to said microprogram counter;
an internal data line connected to said fourth portion of said micro-instruction register;
a working store for storing data comprising a data source and a data sink connected to said internal data line;
an arithmetic logic unit connected to said internal data line for performing arithmetic/logic operations on data supplied by said data source;
a counting register group comprising a plurality of addressable registers connected to said internal data line, having an input connected to said third portion of said micro-instruction register for addressing one of said plurality of registers;
a first decoder having a first input connected to said first portion of said micro-instruction register for controlling said data source, a second input connected to said clock pulse generator, and an inhibit input;
a second decoder having a first input connected to said first portion of said micro-instruction register for controlling said data sink, and a second input connected to said clock pulse generator; and
a third decoder having a first input connected to said third portion of said micro-instruction register, a second input connected to a single bit location of said micro-instruction register, condition inputs, and an output connected to said inhibit input of said first decoder for generating an inhibit signal for inhibiting data transfer from said data source to said data sink.

2. A computer as claimed in claim 1, wherein an output of the third decoder is exclusively connected to an inhibit input of the second decoder.

3. A computer as claimed in claim 1, wherein inputs of said third decoder are connected to condition outputs of further parts of the computer which are connected to the internal data line as a data source.

4. A computer as claimed in claim 3, wherein said counting register group comprises an output for producing a signal indicating a predetermined counter position.

5. A computer as claimed in claim 1, wherein between the microprogram store and the micro instruction register a distributor is included for selectively filling a part of the micro-instruction register with data, which register is divided into parts of equal lengths.

6. A computer as claimed in claim 5, wherein under control of a fifth part of the micro-instruction register, the distributor can be activated selectively for sequentially filling a plurality of parts of the micro-instruction register with data.

7. A computer as claimed in claim 1, wherein in that under control of a signal from the first decoder to the micro-instruction register said fourth part thereof is operatively connected to the internal data line as a data source.

8. A computer as claimed in claim 7, wherein under control of a signal from said second decoder the data from the internal data line then functions as a sub-address for a data sink connected thereto.

9. A computer as claimed in claim 7, wherein under control of a signal from alternatively said first and second decoder, the micro-instruction register can be controlled selectively either as a data source or a data sink.

* * * * *

UNITED STATES PATENT AND TRADEMARK OFFICE
CERTIFICATE OF CORRECTION

PATENT NO. : 4,034,345
DATED : July 5, 1977
INVENTOR(S) : AUGUST DEIS

It is certified that error appears in the above-identified patent and that said Letters Patent are hereby corrected as shown below:

Column 2, line 29, "elxample" should be --example--
        line 40, "is" should be --in--

Column 5, line 44, "(1, 2...1)" should be --(1, 2...)--

Column 8, line 5, "cal" should be --CAl--

Column 9, line 18, "bits." should be --bits,--

Claim 7, line 1, delete "in that"

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*